C. F. Johnson.
Manufacture of Salt.
N° 71494
Patented Nov. 26, 1867.
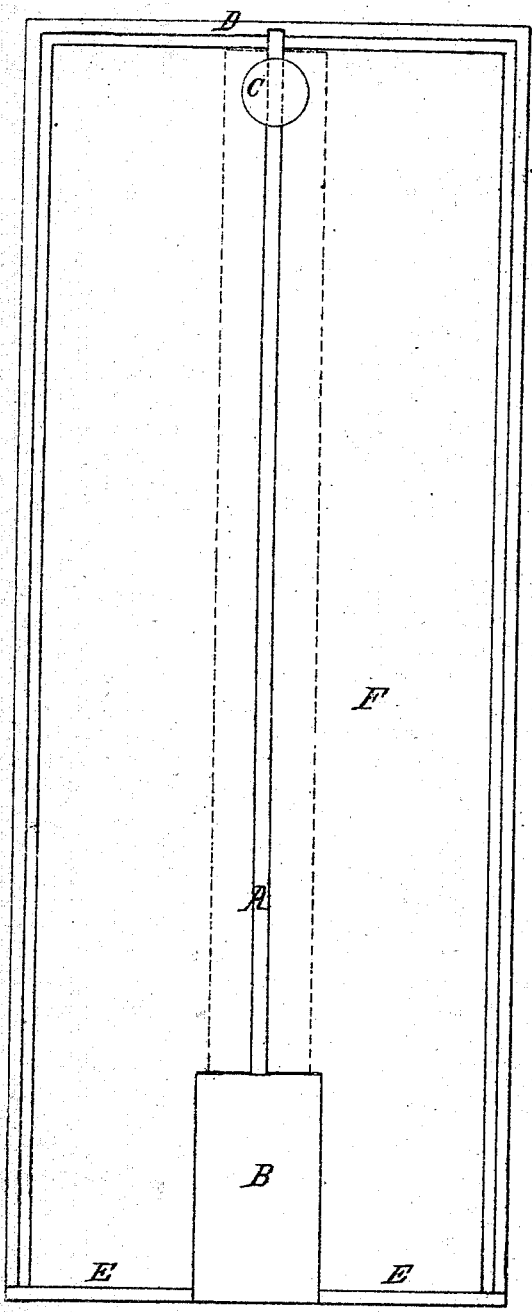
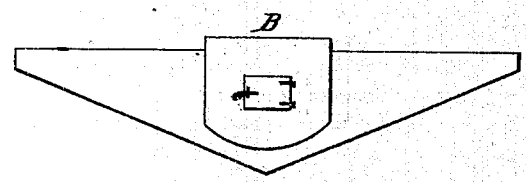
Witnesses.
Ferd. A. Ashley
D. R. Allington
Inventor.
Clarkson F. Johnson

United States Patent Office.

CLARKSON F. JOHNSON, OF EAST SAGINAW, MICHIGAN.

*Letters Patent No. 71,494, dated November 26, 1867; antedated November 15, 1867.*

IMPROVEMENT IN THE MANUFACTURE OF SALT.

*The Schedule referred to in these Letters Patent and making part of the same.*

TO ALL WHOM IT MAY CONCERN:

Be it known that I, CLARKSON F. JOHNSON, of East Saginaw, in the county of Saginaw, and State of Michigan, have invented a new and useful Improvement in the Manufacture of Salt by the Chapin Patent Process; and I do hereby declare that the following is a full, clear, and exact description of the construction and operation of the same, reference being had to the annexed drawings, making a part of this specification, in which—

Figure 1 represents a top view of the Chapin patent process, with my improvement attached.

Figure 2 represents a transverse section of the vat, &c., back of the fire-box, with my improved vat-bottom.

Figure 3 represents a view of the front end of the vat.

The nature and character of my invention consist in increasing the manufacture of salt in the Chapin patent process, and constructing a narrow pan or trough, A, or its equivalent, for carrying the brine in the most heated route from the boiling-box B, in front, back through the smoke-stack C, and emptying into the rear end of the lower body of brine, D, so as to cause the movement of the lower body of brine the other way to the front end, or most heated part of the vat, thereby equalizing the temperature of the entire brine, so as to make salt more rapidly, and making large openings, E, in the front end of the crystallizing-pan bottom F, on either side of the boiling-box B, so as to continue the same flow without a pressure upwards on the pan-bottom F, thereby preventing the unsettled or lower body of brine from leaking through or getting on the crystallizing-pan F until it gets thoroughly settled, and flows forward and up through the large openings E in the front end of the crystallizing-pan F.

My invention further consists in constructing a vat-bottom in the way and manner set forth in the drawings, for the purpose of having the same amount of heat and same evaporating surface as before in a less body of brine, thereby getting the brine hotter and making salt more rapidly.

I do not claim any of the useful combinations of Mr. Nathan Chapin, or other inventors, or their separate devices; but what I do claim as my invention, and desire to secure by Letters Patent, is—

1. Constructing a narrow pan or trough A, or its equivalent, for carrying the brine in the most heated route from the boiling-box B, in front, back through the smoke-stack C, and emptying it into the rear end of the unsettled or lower body of brine, D.

2. I claim making large openings, E, in the front end of the crystallizing-pan F, and on either side of the boiling-box B, to prevent the pressure upward and leakage of the unsettled or lower body of brine on the crystallizing-pan F.

3. I claim constructing a vat-bottom in the way and manner set forth in the drawings.

CLARKSON F. JOHNSON.

Witnesses:
FERD. A. ASHLEY,
D. R. ALLINGTON.